J. J. LINDEN & L. A. ROCKWELL.
AUTOMATIC WEIGHING SCALE.
APPLICATION FILED APR. 13, 1908.

913,298.

Patented Feb. 23, 1909.
2 SHEETS—SHEET 1.

Attest:
Robert Thomas
T. Brandenburg

Inventors;
John J. Linden,
Lucius A. Rockwell
by T. Brandenburg Atty

J. J. LINDEN & L. A. ROCKWELL.
AUTOMATIC WEIGHING SCALE.
APPLICATION FILED APR. 13, 1908.
913,298.
Patented Feb. 23, 1909.
2 SHEETS—SHEET 2.
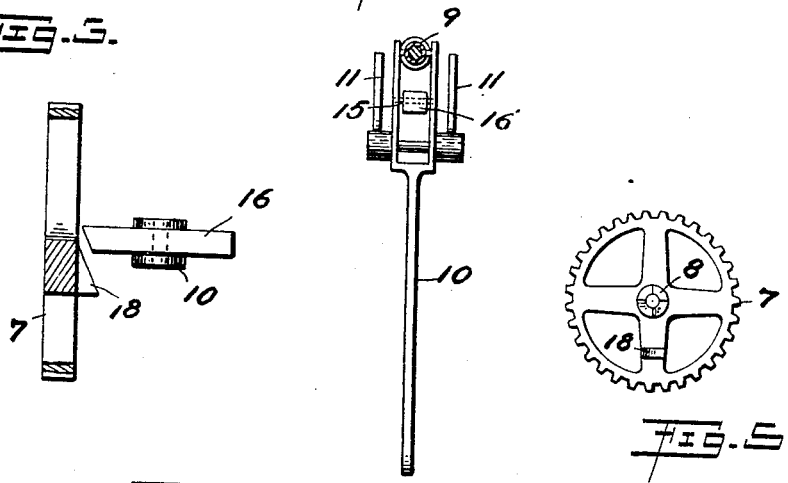
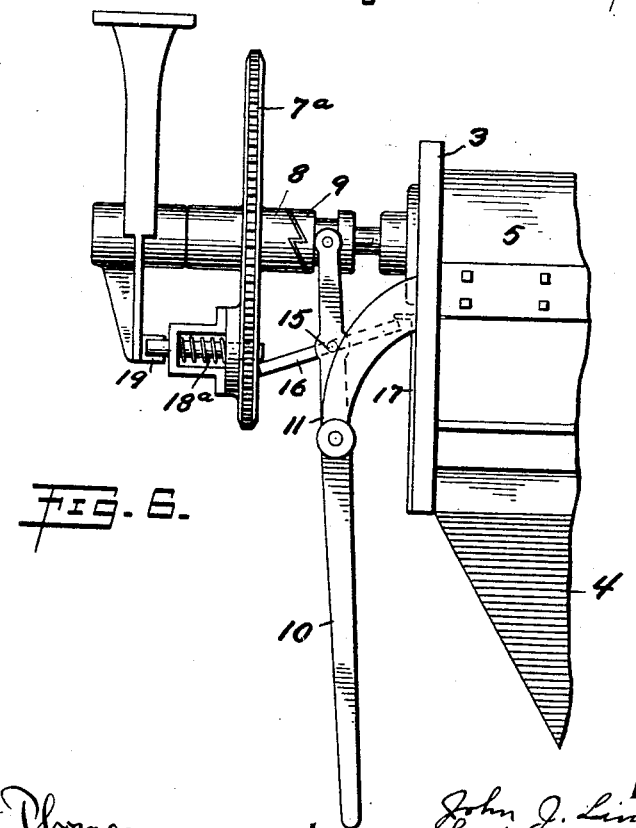
Attest:
Inventors:
John J. Linden,
Lusing A. Rockwell
by
Atty

UNITED STATES PATENT OFFICE.

JOHN J. LINDEN AND LUCIUS A. ROCKWELL, OF NEW YORK, N. Y., SAID LINDEN ASSIGNOR TO SAID ROCKWELL.

AUTOMATIC WEIGHING-SCALE.

No. 913,298.      Specification of Letters Patent.      Patented Feb. 23, 1909.

Application filed April 13, 1908. Serial No. 426,703.

*To all whom it may concern:*

Be it known that we, JOHN J. LINDEN and LUCIUS A. ROCKWELL, citizens of the United States of America, and residents of the city, county, and State of New York, have invented certain new and useful Improvements in Automatic Weighing-Scales, of which the following is a specification.

This invention relates to automatic weighing scales, and the object is to provide novel and improved means whereby the material is fed into the weighing apparatus until a predetermined mass is deposited therein, whereupon the feed is automatically stopped.

Figure 1:
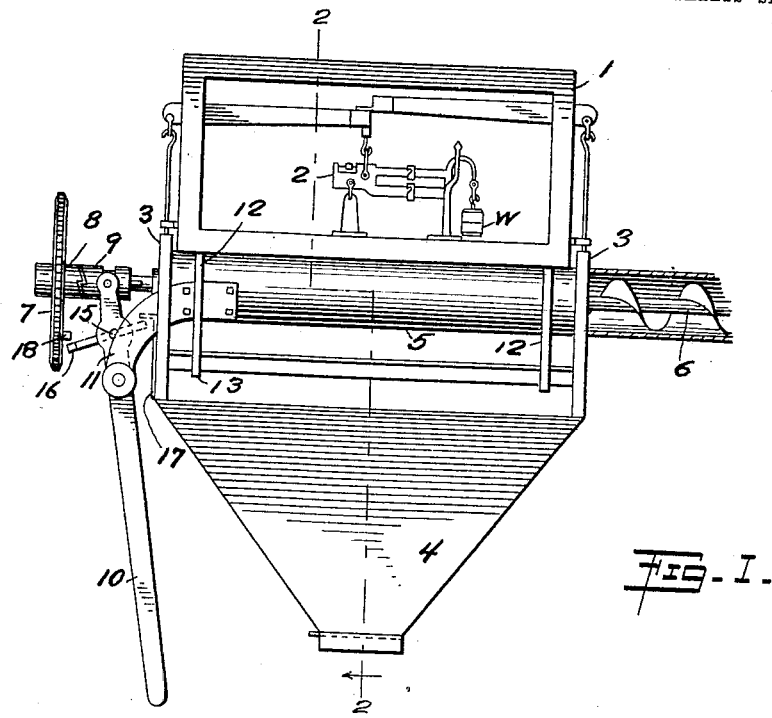
Figure 2:
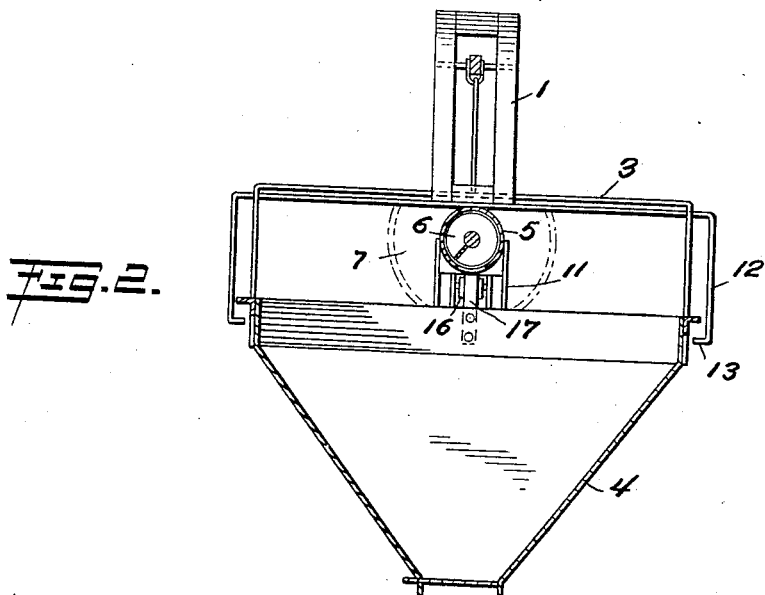

In the drawings, Figure 1 is a front elevation of an apparatus embodying our invention; Fig. 2 is a cross-section on the line 2—2, Fig. 1; Fig. 3 is an enlarged detail view, consisting of a horizontal section through the lower part of the driver and a plan view of the clutch-connected member, showing the relation of these parts; Fig. 4 is a side view of the movable clutch member, the shipping lever, and immediately related parts; Fig. 5 is a side view of the rotary driver; and Fig. 6 is a partial front elevation of another form of apparatus embodying the invention.

Referring for the present to Figs. 1 to 5, 1 indicates any suitable supporting frame, 2 the weighing or scale parts proper, from which is suspended by yokes or frames 3 the receptacle or hopper 4, 5 a conveyer tube having its discharge into said hopper and disposed between the members of yokes 3, 6 a spiral conveyer within the tube 5, 7 a rotary driver, which may be in the form of a sprocket wheel with a clutch member 8 fixed thereto, 9 a slidable clutch member splined to the shaft of the spiral 6, and 10 a shipping lever pivoted to a bracket 11, which may project from the tube 5. The specific construction of these several parts is by no means material to the invention.

In order to support the receptacle 4 at the desired limit of downward movement, four depending straps or rods 12 may be secured to the frame 1 and provided with inturned ends or hooks 13, which are adapted to receive a flange 14 fixed at the top of the receptacle.

Pivoted at 15 to the lever 10 is a member 16, which may be in the nature of a transverse bar. This member is adapted to be shifted by the receptacle 4 in the latter's descent, to assume a position where it will be engaged by the driver 7 to disengage the clutch member 9 from the member 8. While this may be accomplished in a variety of ways, we have shown a projection 17 secured to the receptacle 4, and a cam 18 projecting from the inner face of the driver.

In operation, the conveyer delivers flour or other material to the receptacle 4, until the mass within the receptacle overbalances the weights W. The receptacle now descends until it is supported by the hooks 13; and, during this movement, the projection 17 engages the inner end of the member 16, tilting the latter, so that its outer end occupies a position in the path of the cam 18. Consequently, when the cam engages the member 16, the latter is pushed inward, being guided by its engagement with the projection 17, with the result that the shipping lever is shifted and the clutch member 9 is disconnected. The conveyer is, thus, automatically, stopped; and the predetermined mass of material in the receptacle may now be discharged. When it is desired to admit a new charge to the receptacle, the shipping lever is manually turned in the opposite direction, thus coupling the clutch members and starting the conveyer in motion.

In Fig. 6, the parts bearing numerals similar to those in the preceding figures need not again be described. The driver $7^a$ has abnormally spring retracted pusher member $18^a$, which preferably has a normal inner end face and an inclined outer end face or cam surface, the latter for engagement with a stationary cam projection or abutment 19. The parts are so related that the pusher member $18^a$ commences to be projected as it reaches the portion of its path of travel that coincides with the shifted position of the outer end of the member 16. Consequently, assuming the member 16 to be in its shifted position, its outer end is engaged by the normal end face of the member $18^a$, so as to receive a direct end thrust, with consequent disengagement of the clutch.

While two embodiments of the invention have been shown and described with particularity, it is to be understood that these are illustrative and not definitive of the invention, the application of which may be varied as widely as desired within the scope of the appended claims In former constructions, the feed-stopping mechanism has been actuated directly through the descent of the receptacle or hopper or by a spring or weight which is brought into operation through the descent of the receptacle. The primary novelty of the present invention is the arrangement of parts whereby the driver for the feed mechanism actuates the feed-stopping mechanism. According to this invention, the descent of the receptacle merely serves to shift the member 16 or its equivalent into operative position, where it will be engaged and actuated by the driver. And it will be observed that I use this expression "engaged and actuated by the driver" as applicable to both the illustrated forms of our invention. The feed-stopping mechanism may be of the character represented by parts 9, 10 and 16, or of other character, as far as the controlling principle of the invention is concerned.

What we claim as new is:

1. An automatic weighing scale, comprising weighing apparatus including a receptacle, feed mechanism for supplying said receptacle, feed-stopping mechanism including a member adapted to be shifted into operative position through the descent of the receptacle, and a rotary driver for the feed mechanism constructed and adapted to engage said member when in operative position to actuate the feed-stopping mechanism.

2. An automatic weighing scale, comprising weighing apparatus including a receptacle, a conveyer for supplying said receptacle, a rotary driver, clutch connection between said driver and conveyer, and a member adapted to throw out said clutch connection positioned to be shifted into operative position through the descent of the receptacle, said driver being constructed and adapted to engage said member when in operative position to actuate the same to throw out the clutch connection.

3. An automatic weighing scale, comprising weighing apparatus including a receptacle, a conveyer positioned to supply said receptacle, a rotary driver, a clutch between said driver and conveyer, a shipping lever connected with said clutch, a member pivoted to said shipping lever, and means whereby the descent of the receptacle tilts said member into position to be engaged by said driver to disconnect said clutch.

4. An automatic weighing scale, comprising weighing apparatus including a receptacle, feed mechanism for supplying the receptacle, a rotary driver for the feed mechanism, a normally retracted pusher member carried by the driver, feed-stopping mechanism including a member adapted to be shifted through the descent of the receptacle into operative position where it will be engaged and actuated by said pusher member when the latter is projected, and a stationary abutment adapted to be engaged by and effect the projection of said pusher member.

Signed at New York, N. Y. this 8th day of April 1908.

JOHN J. LINDEN.
LUCIUS A. ROCKWELL.

Witnesses:
H. L. ROCKWELL,
J. F. BRANDENBURG.